Dec. 22, 1953     W. J STONESIFER     2,663,284
CATTLE AND HOG OILER
Filed June 22, 1951                                      2 Sheets—Sheet 1
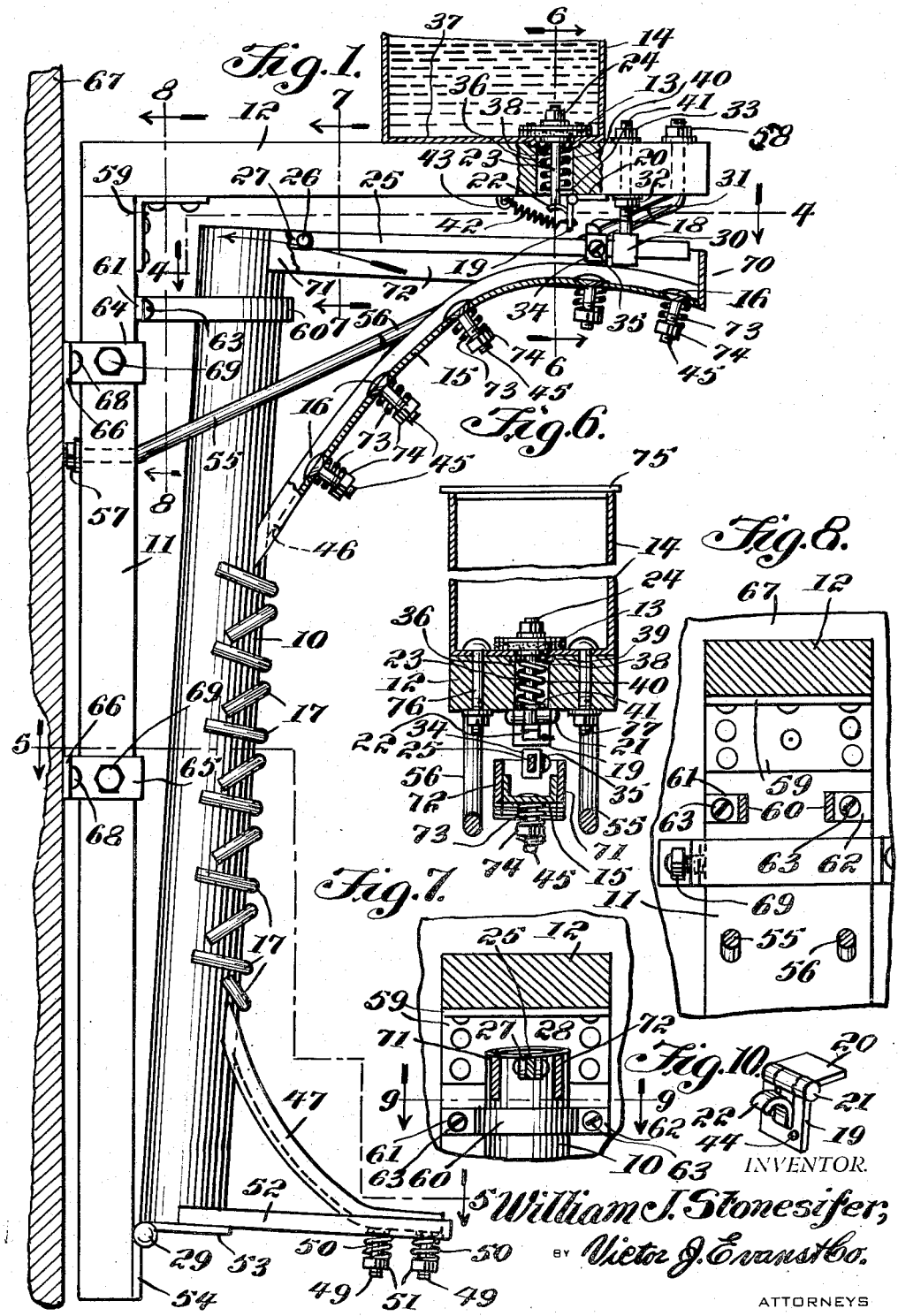
INVENTOR.
William J. Stonesifer,
BY Victor J. Evans & Co.
ATTORNEYS Dec. 22, 1953   W. J STONESIFER   2,663,284
CATTLE AND HOG OILER
Filed June 22, 1951   2 Sheets—Sheet 2
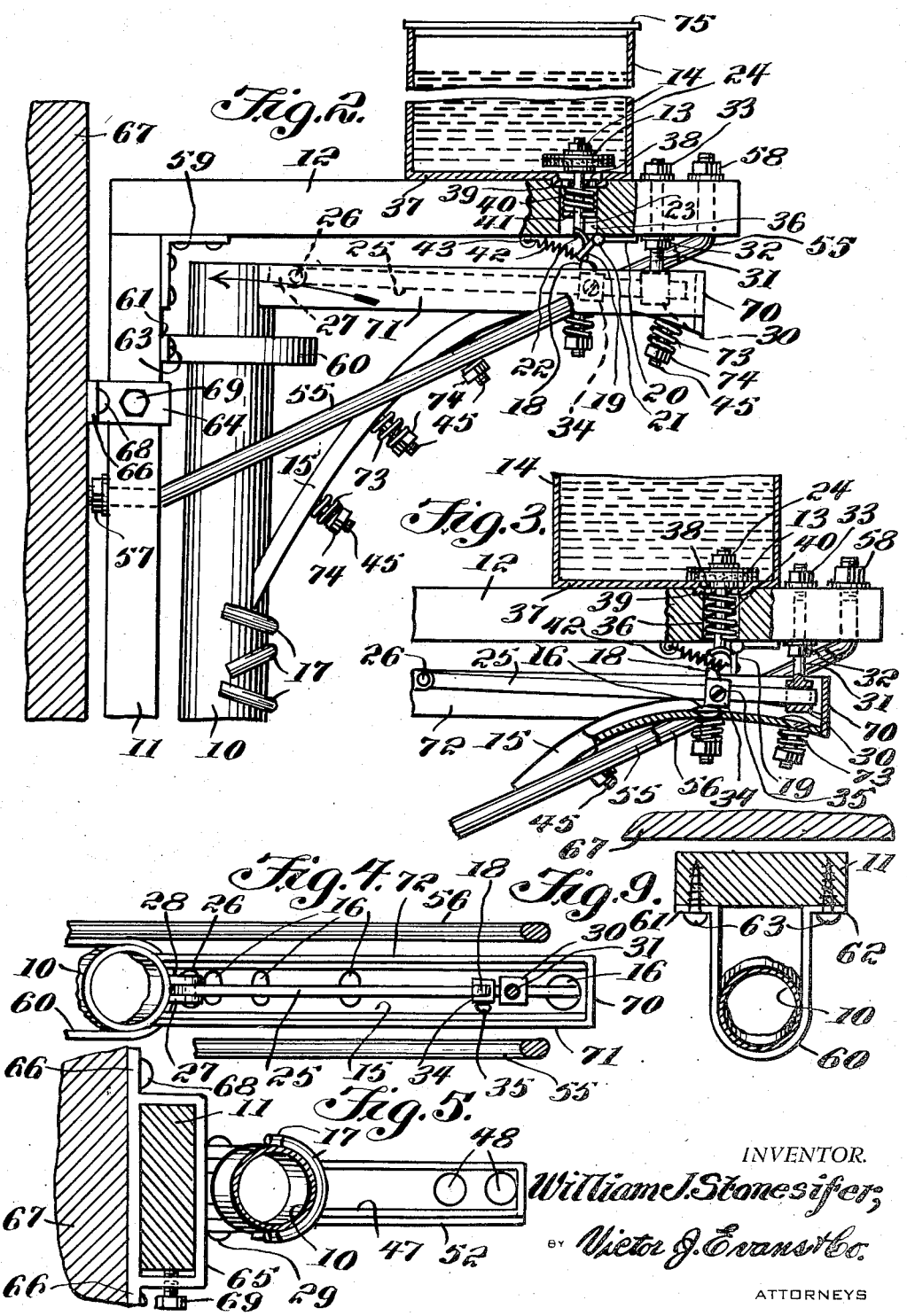
INVENTOR.
William J. Stonesifer,
BY Victor J. Evans & Co.
ATTORNEYS Patented Dec. 22, 1953

2,663,284

UNITED STATES PATENT OFFICE 2,663,284

CATTLE AND HOG OILER

William J. Stonesifer, Taneytown, Md.

Application June 22, 1951, Serial No. 232,927

4 Claims. (Cl. 119—157)

This invention relates to devices used on farms, somewhat similar to rubbing posts where cattle, hogs and the like scratch themselves against the posts, and in particular a rubbing post pivotally mounted in a frame with the frame supporting a container of oil or the like and with the rubbing post automatically opening a valve in the lower end of the container to drop oil upon an animal as the animal rubs the post.

The purpose of this invention is to provide an oiling device in combination with a rubbing post whereby the rubbing action of cattle, hogs, and the like against the post operates means for applying oil to the animal rubbing the post.

Animals and particularly cattle and hogs are continuously rubbing parts of their bodies against tree trunks, fence posts, and other rigid obstructions to relieve the annoyance of lice and the like and this provides only temporary relief. With this thought in mind this invention contemplates a rubbing post or the like that automatically drops oil or other liquid upon an animal as the animal scratches parts of his body upon the post, whereby the lice are continuously destroyed.

The object of this invention is, therefore, to provide a device that operates automatically to supply oil to parts of the body of an animal as the animal scratches or rubs his body against the device.

Another object of the invention is to provide an oil applying device whereby oil is automatically released upon engagement of the device by an animal in which the supply of the oil and distributing means therefor is actuated by engagement of the body of an animal with parts of the device.

A further object of the invention is to provide an oiling device for automatically applying oil to the body of an animal whereby engagement of the body of the animal with a rubbing post pivotally mounted in the device releases the oil, in which the device is of a comparatively simple and economical construction.

With these and other objects and advantages in view the invention embodies an L-shaped frame having a rubbing post pivotally mounted therein with a container having a valve in the lower end mounted on the frame and wherein pressure applied to the face of the post moves the post inwardly, opening the said valve in the container and releasing oil which is dropped through valves in an arcuate chute upon the body of an animal engaging the post.

Other features and advantages of the invention will appear from the following description taken in connection with the drawings wherein:

Figure 1 is a side elevational view illustrating the cattle and hog oiler with parts broken away and shown in section and with the parts shown with the post in the extended or free position.

Figure 2 is a similar view showing the upper end of the post, also with parts shown in section and with the post moved inwardly to the position of holding the valve open.

Figure 3 is a similar view also showing the upper end of the post and illustrating the positions of the parts with the post moved to the inner position wherein the valve is released and actuated to the closed position by a spring.

Figure 4 is a sectional plan taken on line 4—4 of Figure 1 illustrating the relative positions of the parts extended from the post.

Figure 5 is also a sectional plan taken on line 5—5 of Figure 1 showing the mounting of the lower end of the post.

Figure 6 is a cross section through the outer end of the frame taken on line 6—6 of Figure 1 showing the oil container, valve, operating arm and chute.

Figure 7 is a cross section taken on line 7—7 of Figure 1 showing a section through the horizontal section of the frame and also showing the upper end of the post.

Figure 8 is a cross section through the inner part of the frame taken on line 8—8 of Figure 1.

Figure 9 is a sectional plan taken on line 9—9 of Figure 7 showing a yoke for holding the upper end of the post.

Figure 10 is a detail illustrating a trigger for operating the valve in the lower end of the oil container.

Referring now to the drawings wherein like reference characters denote corresponding parts the improved cattle and hog oiler of this invention includes a rubbing post 10, an L-shaped supporting frame having a vertically disposed leg 11 and a horizontal arm 12, a valve disc 13 positioned in a supply container 14 and a distributing chute 15 having spaced valves 16 therein.

The face of the post 10 is provided with spaced cleats 17 that are positioned to be engaged by parts of the body of an animal as the animal rubs the post and as the post is engaged it is forced inwardly toward the leg 11 with a trip 18 engaging a plate 19 of a trigger formed with a base plate 20 to which the plate 19 is pivotally connected by a bolt 21 and which is also provided with an arcuate finger 22 that engages the lower end of a valve stem 23 on the upper end of which the valve disc 13 is secured by a nut 24.

The trip 18 is slidably mounted on a bar 25 that is pivotally mounted by a pin 26 between ears 27 and 28 on the upper end of the post whereby the bar 25 may travel substantially in a horizontal plane as the chute 15 moves about the center of a hinge pin 29 with which the post is pivotally connected to the leg 11 of the frame. The outer end of the arm 25 is slidably held in a hub 30 on the lower end of a stud 31 that is adjustably held by nuts 32 and 33 in the outer end of the arm 12. The trip 18 extends from a hub 34 that slides on the bar 25 and the hub of the trip is held in adjusted positions by a screw 35.

As the post 10 is moved inwardly the trip 18 engages the plate 19 of the trigger, as shown in Figure 2 and the finger 22, engaging the lower end of the valve stem 23 moves the stem upwardly, raising the valve disc 13 to the position shown in Figure 2 wherein the valve is opened and oil in the container 14 is free to flow through the passage 36 in the arm 12.

The lower end of the container 14 is provided with a bottom 37 in which an opening 38 is provided and material from the opening 38 is pressed downwardly forming a flange 39 in which perforations are provided to facilitate the passage of oil around the valve stem. A spring 40 positioned around the valve stem 23 urges the valve disc downwardly to the closed position, the lower end of the spring being held to the valve stem by a pin 41, as shown in Figure 1. A spring 42, which extends from the base of the finger 22 is attached to an eye 43 on the arm 12 whereby the trigger is urged to the position shown in Figure 1 with the upper surface of the finger 22 against the lower end of the valve stem.

The plate 19 of the trigger is provided with an opening 44 through which the end of the spring is connected to the finger 22.

As the rubbing post 10 is contacted the parts are moved inwardly from the position shown in Figure 1 to the position shown in Figures 2 and 3 and in the position shown in Figure 2 the valve is held open by the trip 18 whereas in the position shown in Figure 3, the trip has passed beyond the plate 19 whereby the valve is released so that the spring 40 brings the valve downwardly to the closed position.

The oil dropping from the valve passes into the chute 15 and as stems 45 of the valves 16 are engaged by the animal the valves are opened whereby the oil drops through the valves upon the back or other part of the body of the animal. The lower end of the chute is provided with openings 46 through which the oil passes downwardly on the post 10 and over the cleats 17 so that it is rubbed into the skin of the animal.

Oil passing downwardly over the cleats 17, passes into a lower arcuate chute 47 and the chute 47 is provided with valves 48, similar to the valve 16. The valves 48 are provided with stems 49 and springs 50, positioned on the stems, and held by the nuts 51 urge the valves to closed positions.

The chute 47 is supported by an arm 52 that extends outwardly from the lower end of the post 10. The hinge 29 is provided with a plate 53 that is secured to the lower end of the post and also a plate 54 that is mounted on the lower end of the leg 11.

The arm 12 is supported by guard rails 55 and 56, the lower ends of which are secured in the leg 11 by nuts 57 and the upper ends of which are secured in the extended end of the arm 12 by nuts 58. The arm 12 is secured to the upper end of the leg 11 with a clip angle 59 that may be secured to the parts by rivets or by welding as may be desired.

The upper part of the leg 11 is provided with a yoke 60, which extends around the post 10, limiting outward movement thereof, and the ends of the yoke are provided with flanges 61 and 62 by which the yoke is secured to the leg 11 by screws 63.

The leg 11 is mounted in brackets 64 and 65 that may extend continuously around the leg, as shown in Figure 5, or which may be of any suitable type or design. In the design shown the brackets are provided with flanges 66 by which the brackets are attached to a post or wall 67 by screws or bolts 68. The brackets 64 and 65 may be provided with set screws 69 by which the position of the leg 11 in the brackets may be adjusted.

The outer end of the chute 15 is supported by a U-shape bracket 70 having side bars 71 and 72 that extend outwardly from the upper end of the post 10.

With the parts arranged in this manner the cattle and hog oiler of this invention may be mounted on a post positioned on a fence or wall and as animals rub against the post oil drops into the chute 15 and through the valves 16 which are normally held closed by springs 73 that bear against nuts 74 on the stems of the valves whereby the ends of the stems are engaged by animals to release oil in the chute so that oil will drop only when animals are positioned below the valves and chute.

It will be understood that an oil can or a container of any suitable type may be used, and in the design shown the container 14, which is provided with a cover 75 is secured to the arm 12 by bolts 76 and 77.

It will be understood that the cattle and hog oiler of this invention may be provided in different sizes with one size suitable for use with hogs and another adapted to be used with cattle. Other sizes may also be provided for use with other animals.

It will be understood that modifications may be made in the design and arrangement of the parts without departing from the spirit of the invention.

What is claimed is:

1. A cattle and hog oiler comprising a vertically positioned rubbing post, a frame, means pivotally mounting the lower end of the post in the frame, a container carried by the frame, an arcuate chute having spaced openings in the bottom thereof carried by the post and extended to receive fluid from the container, valves in the openings of the chute and positioned with stems thereof extended through the bottom of the chute and positioned to be engaged by an animal rubbing against the post, springs on the valve stems for urging the valves to closed positions a valve positioned in the lower end of the container, and means operatively associated with the valve of the container for opening the valve to release fluid in the container upon engagement of the post by an animal, said container positioned whereby fluid drops into the chute as an animal engages the post.

2. In an animal oiling device, the combination which comprises an L-shaped frame having a vertical leg with a horizontal arm extended from the upper end, a post positioned below the arm and pivotally mounted on the lower end of the leg, a container positioned upon the horizontal arm of the frame, an arcuate chute having spaced openings in the bottom thereof carried by the post and extended to receive fluid from the container, valves in the openings of the chute and positioned with stems thereof extended through the bottom of the chute and positioned to be engaged by an animal rubbing against the post, springs on the valve stems for urging the valves to closed positions a valve in the lower end of the container, and a trip carried by the upper end of the post and positioned to open the valve in the container upon movement of the upper end of the post toward the leg of the frame.

3. In an animal oiling device, the combination which comprises an L-shaped frame having a vertical leg with a horizontal arm extended from the upper end, a post positioned below the arm and pivotally mounted on the lower end of the leg, a container positioned upon the horizontal arm of the frame, a valve in the lower end of the container, an arcuate chute extended from the upper part of the post and positioned below the valve of the container, valves in the chute positioned to be opened by engagement thereof with animals positioned below the chute, and a trip carried by the upper end of the post and positioned to open the valve in the container when the upper end of the post is moved inwardly toward the vertical leg of the frame.

4. In an animal oiling device, the combination which comprises an L-shaped frame having a vertical leg with a horizontal arm extended from the upper end, a post positioned below the arm and pivotally mounted on the lower end of the leg, a container positioned upon the horizontal arm of the frame, a valve in the lower end of the container, an arcuate chute extended from the upper part of the post and positioned below the valve of the container, valves in the chute positioned to be opened by engagement thereof with animals positioned below the chute, a trigger pivotally mounted on the under surface of the horizontal arm of the frame and positioned to open the valve of the container, and a trip carried by the upper end of the post and positioned to engage the trigger for opening the said valve in the container.

WILLIAM J. STONESIFER.

References Cited in the file of this patent

UNITED STATES PATENTS

| Number | Name | Date |
|---|---|---|
| 1,080,037 | Wright | Dec. 2, 1913 |
| 1,151,883 | Jones | Aug. 31, 1915 |
| 1,173,958 | Haines | Feb. 29, 1916 |
| 1,174,135 | Farrar | Mar. 7, 1916 |
| 1,216,081 | Cox | Feb. 13, 1917 |
| 1,300,297 | Randall | Apr. 15, 1919 |
| 1,327,088 | Curttright | Jan. 6, 1920 |
| 2,573,873 | Rhoades | Nov. 6, 1951 |